UNITED STATES PATENT OFFICE.

FRANK HIGEL, OF PHILADELPHIA, PENNSYLVANIA.

GLUCOSE.

SPECIFICATION forming part of Letters Patent No. 248,313, dated October 18, 1881.

Application filed July 5, 1881. (No specimens.)

*To all whom it may concern:*

Be it known that I, FRANK HIGEL, a citizen of the United States, residing in the city and county of Philadelphia, and State of Pennsylvania, have invented a new and useful Improvement in Glucose, of which the following is a specification.

My invention consists, essentially, of the production of glucose from the root of the cassava-plant.

In treating the aforesaid root for the purpose named, one of the methods of procedure is as follows: The root on being taken from the ground is cleaned of its rough coating by placing it in a rotating rumbler or other suitable apparatus. It is then crushed or ground into a fine pulp, and the mass placed in a converter with a sufficient quantity of sulphuric acid and water, or sulphuric and nitric acids and water, in the proportion of two parts of the acid and water to one hundred parts of the pulped mass. The mass is then boiled slowly until it is converted into sirup or sugar. The sirup is then neutralized by the addition of pulverized or calcined sea-shells, and afterward filtered and concentrated. This can be modified by separating the starch from all other ingredients and converting it separately into sirup while the residue is ground and bolted, and produces a new article of commerce.

It will be seen that I utilize a plant which has been introduced into and cultivated but lately in the United States. I have found that said plant contains a considerable quantity of saccharine matter, and makes a sirup or sugar which is much finer than that made from other sources, and is more economically produced, as the whole mass of the plant may be converted into sirup or sugar, thus avoiding the large percentage of waste in albumen, fibrine, gluten, &c., contained in sirup made of grain, vegetables, &c. Furthermore, my sirup is produced white and clear, requiring no chemical treatment to bleach it, and owing to the delicate character of the plant the sirup is more soluble in its nature than any heretofore known. The sugar granulates much more readily, and in the process of granulation assumes more of the form of crystals of cane-sugar than that of grape-sugar made from grain, &c.

The botanical name of cassava is *Manihot*.

Having thus described my invention, what I claim as new, and desire to secure by Letters Patent, is—

1. As a new article of manufacture, glucose made from the root of the plant known as *Manihot*, as set forth.

2. The herein-described improvement in the manufacture of sugar and sirup, consisting in treating the root of the cassava-plant or its products with acid, substantially as set forth.

FRANK HIGEL.

Witnesses:
JOHN A. WIEDERSHEIM,
W. F. KIRCHER.